United States Patent
Hong et al.

(10) Patent No.: US 9,583,957 B2
(45) Date of Patent: Feb. 28, 2017

(54) CELL BALANCING INTEGRATED CIRCUIT, CELL BALANCING SYSTEM, AND CELL BALANCING METHOD

(71) Applicant: SILICON WORKS CO., LTD., Daejeon-si (KR)

(72) Inventors: Ju Pyo Hong, Daejeon-si (KR); Yong Goo Kim, Daejeon-si (KR); Chol Ho Kim, Daejeon-si (KR); Moon Young Kim, Daejeon-si (KR); Jun Ho Kim, Daejeon-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 488 days.

(21) Appl. No.: 14/022,904

(22) Filed: Sep. 10, 2013

(65) Prior Publication Data
US 2014/0070757 A1   Mar. 13, 2014

(30) Foreign Application Priority Data

Sep. 10, 2012 (KR) .................. 10-2012-0100117
Sep. 10, 2013 (KR) .................. 10-2013-0108410

(51) Int. Cl.
*H02J 7/14* (2006.01)
*H02J 7/00* (2006.01)

(52) U.S. Cl.
CPC .......... *H02J 7/0054* (2013.01); *H02J 7/0018* (2013.01); *H02J 7/0019* (2013.01)

(58) Field of Classification Search
CPC ..................................................... Y02E 60/12
USPC ........................................................ 320/103
See application file for complete search history.

(56) References Cited

U.S. PATENT DOCUMENTS

| | | | | |
|---|---|---|---|---|
| 2010/0007308 | A1* | 1/2010 | Lee ..................... | H02J 7/0018 320/118 |
| 2010/0244781 | A1* | 9/2010 | Kramer ................ | H02J 7/0016 320/162 |
| 2012/0007558 | A1* | 1/2012 | Pigott .................. | H02J 7/0018 320/118 |
| 2013/0021000 | A1* | 1/2013 | Kuraishi .............. | H02J 7/0016 320/118 |
| 2013/0049673 | A1* | 2/2013 | Agarwal .............. | H02J 7/0016 320/101 |
| 2013/0057200 | A1* | 3/2013 | Potts ................ | H02M 3/33584 320/107 |
| 2013/0187605 | A1* | 7/2013 | Potts ..................... | H02J 7/0052 320/112 |
| 2013/0221900 | A1* | 8/2013 | Hwang ................. | H02J 7/0016 320/107 |
| 2013/0300371 | A1* | 11/2013 | Bills ..................... | H02J 7/0016 320/118 |
| 2014/0077752 | A1* | 3/2014 | Barsukov ............. | H02J 7/0021 320/103 |
| 2015/0288199 | A1* | 10/2015 | Bui-Van ............... | B60L 3/0046 320/118 |

(Continued)

*Primary Examiner* — Suresh Memula

(57) ABSTRACT

Introduced are a cell balancing integrated circuit which may be realized including a small number of switches or diodes, an energy non-consumption type cell balancing system including the cell balancing integrated circuit, and an energy non-consumption type cell balancing method. The energy non-consumption type cell balancing system includes a battery pack, a cell balancing circuit, and a plurality of inductors and capacitors.

19 Claims, 16 Drawing Sheets

(56) References Cited

U.S. PATENT DOCUMENTS

2015/0380952 A1* 12/2015 Brandt ................ H01M 10/441
  320/119
2016/0111900 A1* 4/2016 Beaston ................ H02J 7/0021
  320/134

* cited by examiner

CELL BALANCING INTEGRATED CIRCUIT, CELL BALANCING SYSTEM, AND CELL BALANCING METHOD

BACKGROUND OF THE INVENTION

Field of the Invention

The present invention relates to a cell balancing technology, and more particularly, to a cell balancing technology capable of reducing the number of components and reducing the area of a circuit.

Description of the Related Art

In general, a secondary battery refers to a battery that is capable to store energy and to discharge the stored energy for use. When a secondary battery includes one battery cell, a voltage may be restricted due to chemical or structural problems. Accordingly, in application fields in which a high voltage is necessary, a secondary battery may be configured with a battery pack in which a necessary number of battery cells is connected in series. Even when battery cells are manufactured under the same manufacturing conditions and the same environments, the battery cells differ in electrical characteristics. Therefore, when a plurality of battery cells are configured in one battery pack, an imbalance in a voltage or an imbalance in a remaining amount of charge between the battery cells connected to each other may occur under charger and discharge environments.

When a charge voltage of a battery cell is too high, there is a danger of a fire or an explosion. Conversely, when the charge voltage is too low, electrical characteristics may be lost. In order to prevent such problems, a secondary battery operates as follows when one of a plurality of battery cells is overcharged or under-discharged. That is, when some of the plurality of battery cells connected in series are overcharged more than the other battery cells, charging of the other battery cells is interrupted in an insufficient charge state. In contrast, when some of the battery cells are overdischarged, use of the charged energy is restricted in spite of the fact that the other battery cells yet have usable charged energy.

For this reason, the imbalance in a voltage or the imbalance in a remaining amount of charge between the plurality of battery cells connected in series may occur in the secondary battery. Further, a voltage range usable in each of the battery cells may decrease as charging and discharging are repeated or charging and discharging periods may be shortened, thereby shortening a lifecycle of each battery cell. In order to overcome such disadvantages, battery cell balancing methods have been suggested.

FIG. 1 is a diagram illustrating an energy consumption type cell balancing circuit according to the related art. The energy consumption type cell balancing circuit performs balancing of battery cells, consuming overcharged energy.

Referring to FIG. 1, an energy consumption type cell balancing circuit 100 according to the related art includes a voltage detection circuit 120 configured to detects an individual voltage of a plurality of battery cells B1, B2, . . . , and Bn connected in series and a processor 110 configured to control individual cell equalizers 131, 132, and 133 such that overcharged energy of a battery cell determined to be overcharged by the voltage detection circuit 120 is discharged using a resistor. The foregoing energy consumption type cell balancing circuit according to the related art has the disadvantage that energy wastes since the overcharged energy is emitted as heat via the resistor.

Accordingly, it is necessary to suggest an energy cell balancing method of reducing energy waste.

SUMMARY OF THE INVENTION

Accordingly, the present invention has been made in an effort to solve the problems occurring in the related art, and an object of the present invention is to provide a cell balancing technology for a secondary battery capable of reducing energy waste.

Another object of the present invention is to provide a cell balancing technology for performing cell balancing by an energy non-consumption type method to reduce energy waste of a secondary battery.

Still another object of the present invention is to provide a cell balancing technology for realizing cell balancing using a small number of components to reduce the area of a circuit configured for the cell balancing.

Further still another object of the present invention is to provide a cell balancing integrated circuit, a cell balancing system, and a cell balancing method of realizing the foregoing cell balancing technologies.

In order to achieve the above object, according to one aspect of the present invention, there is provided an energy non-consumption type cell balancing integrated circuit including: a first path provide block configured to provide a first energy delivery path between at least one battery cell and at least one first energy storage element; and a second path provide block configured to provide a second energy delivery path between at least one of the first energy storage elements and a second energy storage element.

According to another aspect of the present invention, there is provided a battery cell balancing method including: delivering energy of at least one overcharged battery cell to at least one corresponding first energy storage element and storing the energy; delivering the energy stored in at least the one first energy storage element to a second energy storage element and storing the energy; and maintaining cell balancing in regard to at least one battery cell.

According to still another aspect of the present invention, there is provided a cell balancing system including: a battery pack configured to include at least one battery cell; at least one first energy storage element configured to correspond to at least the one battery cell; a second energy storage element; and a cell balancing integrated circuit configured to provide a first energy delivery path along which energy of the overcharged battery cell is delivered to the corresponding first energy storage element or to provide a second energy delivery path along which energy stored in the first energy storage element is delivered to the second energy storage element in response to a mode signal.

According to the aspects of the invention, it is possible to obtain an advantages of reducing energy waste since the cell balancing technology for a secondary battery may be realized by the energy non-consumption type method, and an advantage of reducing the area of the circuit since the cell balancing technology may be realized using a small number of components.

More specifically, since it is possible to reduce the number of components such as switches, diodes, and transformers necessary to realize a cell balancing integrated circuit or system of a secondary battery including a plurality of battery cells, the area of the circuit necessary to realize the cell balancing technology in the integrated circuit or system may be reduced.

Further, there is the advantages that a circuit for the cell balancing may be configured by a small number of switches and diodes so that the battery cells are not short-circuited even when switches between the plurality of battery cells included in the secondary battery are simultaneously turned on and the circuit for the cell balancing may be realized in a form of an integrated circuit or a module in which several integrated circuits are connected.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
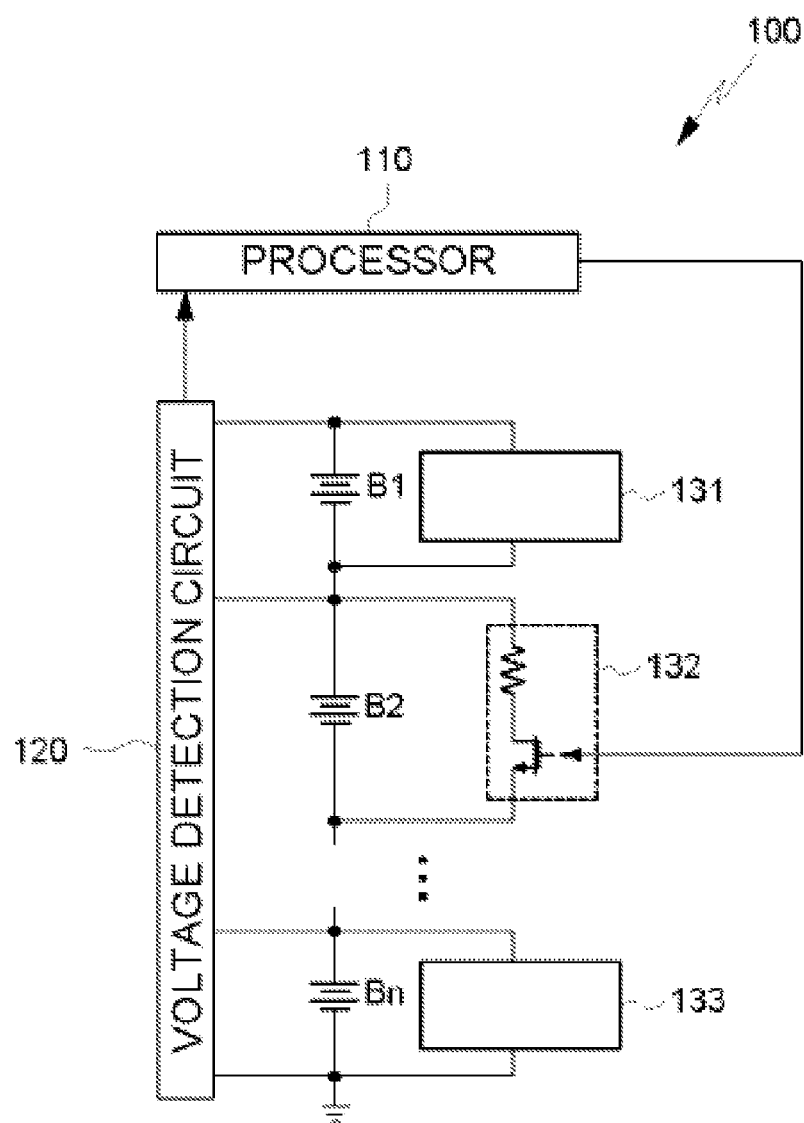
FIG. 1 is a diagram illustrating an energy consumption type cell balancing circuit according to the related art.

To sufficiently understand the present invention, the advantages in operations of the present invention, and purposes achieved in embodiments of the present invention, the accompanying drawings to be described in exemplary embodiments of the present invention and details described in the accompanying drawings should be referred to.

Hereinafter, preferred embodiments of the present invention will be described with reference to the accompanying drawings to describe the present invention in detail. The same reference numerals used in the drawings are given to the same members.

The present invention introduces a cell balancing technology to resolve an imbalance in a voltage and an imbalance in a remaining amount of charge between a plurality of battery cells connected in series and to improve shortening of lifecycle of each battery cell. The cell balancing technology for a secondary battery may be realized according to an energy non-consumption type method of performing balancing of the battery cells while reducing energy waste.

Figure 2:
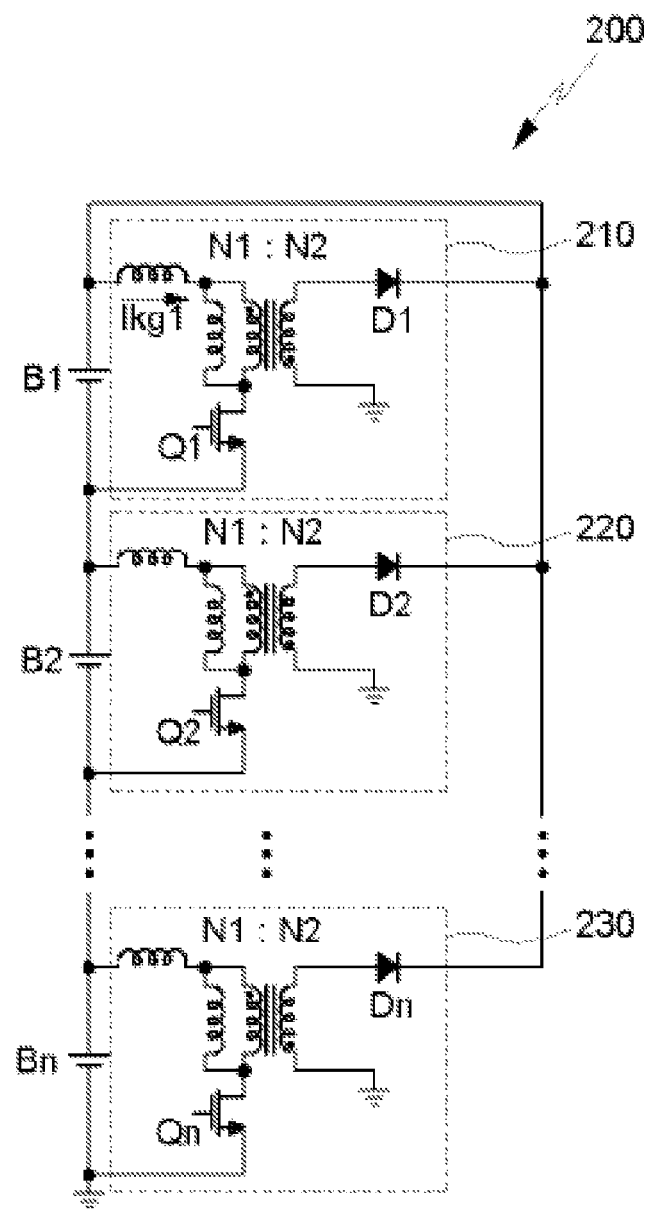
FIG. 2 is a diagram illustrating an example of an energy non-consumption type cell balancing circuit.

According to the foregoing energy non-consumption type method, a circuit in FIG. 2 may be introduced. An energy non-consumption type cell balancing circuit 200 in FIG. 2 uses cell equalizers 210, 220, . . . , and 230 that each include a converter. The converter may be configured using a DC-DC converter. The DC-DC converter may include a transformer that performs DC-DC conversion by a switching operation of each switch Q1, Q2, . . . , and Qn. The transformer is generally configured to have a coil ratio of N1:N2 for the DC-DC conversion.

The energy non-consumption type cell balancing circuit 200 in FIG. 2 may perform cell balancing by delivering an overcharged energy Ikg1 of a battery cell to all of the battery cells B1, B2, . . . , and Bn via the cell equalizers 210, 220, . . . , and 230.

Figure 3:
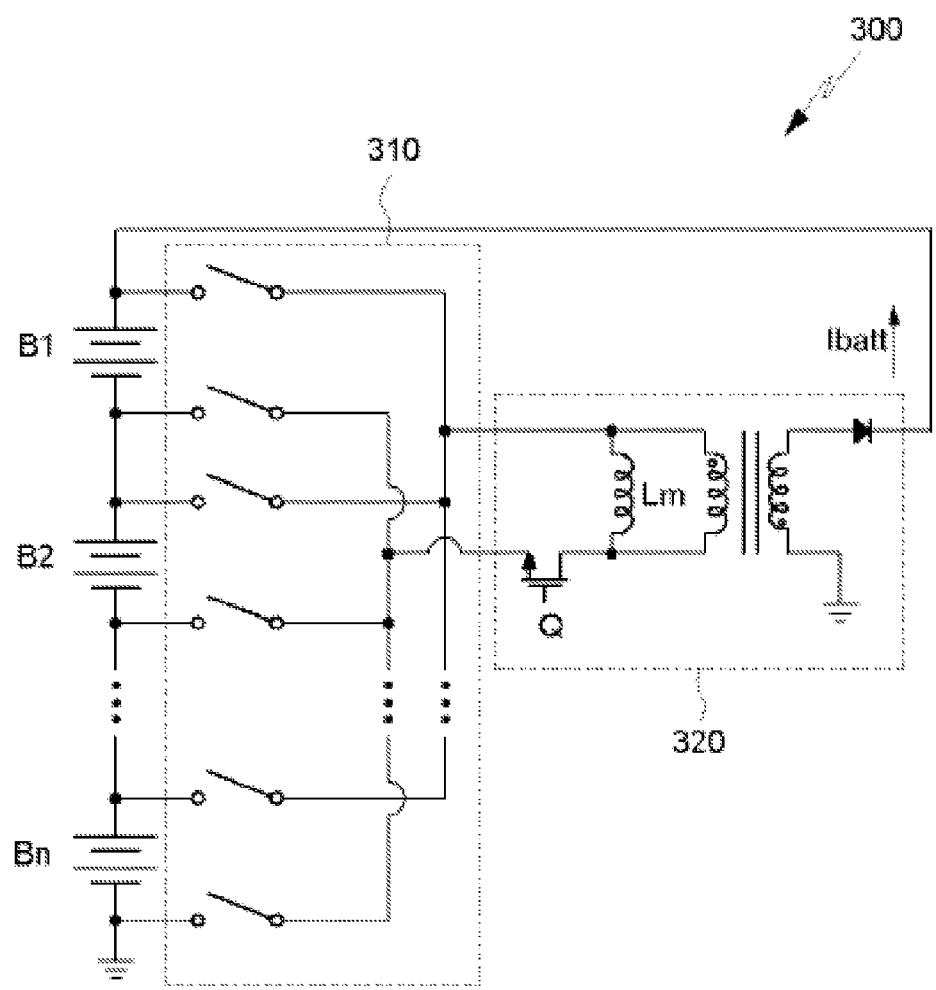
FIG. 3 is a diagram illustrating another example of the energy non-consumption type cell balancing circuit.

FIG. 3 is a diagram illustrating another example of the energy non-consumption type cell balancing circuit.

An energy non-consumption type cell balancing circuit 300 in FIG. 3 uses one converter 320 and a switch block 310 configured to include a plurality of switches connected to a plurality of battery cells B1, B2, . . . , and Bn. The energy non-consumption type cell balancing circuit 300 in FIG. 3 has a configuration in which overcharged energy of a battery cell selected according to a switching state of the switch block 310 is converted in the converter 320 and the converted energy is subsequently delivered to all of the battery cells B1, B2, . . . , and Bn. In FIG. 3, Ibatt indicates energy to be delivered to all of the battery cells, Q indicates a switch configured to switch delivery of the overcharged energy of a selected battery cell B1, B2, . . . , or Bn to a transformer included in the converter 320, and Lm indicates an inductor connected to the primary side of the transformer so that the energy delivered by the switch Q is stored.

Figure 4:
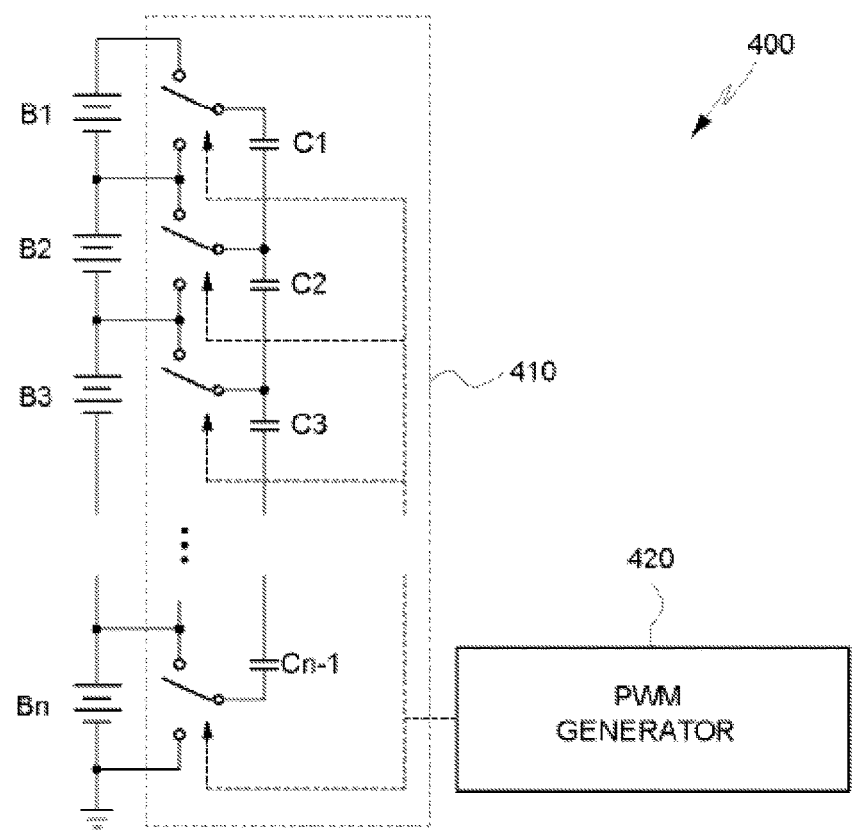
FIG. 4 is a diagram illustrating still another example of an energy non-consumption type cell balancing circuit.

FIG. 4 is a diagram illustrating still another example of an energy non-consumption type cell balancing circuit.

An energy non-consumption type cell balancing circuit 400 in FIG. 4 maintains cell balancing using a circuit 410 configured to include a plurality of switches connected between battery cells B1, B2, B3, . . . , and Bn, respectively, and capacitors C1, C2, C3, . . . , and Cn−1 connected between the switches, respectively, i.e., a switched capacitor circuit. The energy non-consumption type cell balancing circuit 400 in FIG. 4 preferably further includes a PWM generator 420 to provide a control signal determining switch operations of the plurality of switches connected to battery cells B1, B2, B3, . . . , and Bn, respectively. The energy non-consumption type cell balancing circuit 400 in FIG. 4 may selectively perform charging of the capacitors C1, C2, C3, . . . , and Cn−1 with overcharged energy of the battery cells B1, B2, B3, . . . , and Bn and discharging of the charged energy of the capacitors C1, C2, C3, . . . , and Cn−1 to the battery cells B1, B2, B3, . . . , and Bn by the switching according to the control signal provided from the PWM generator 420.

Figure 5:
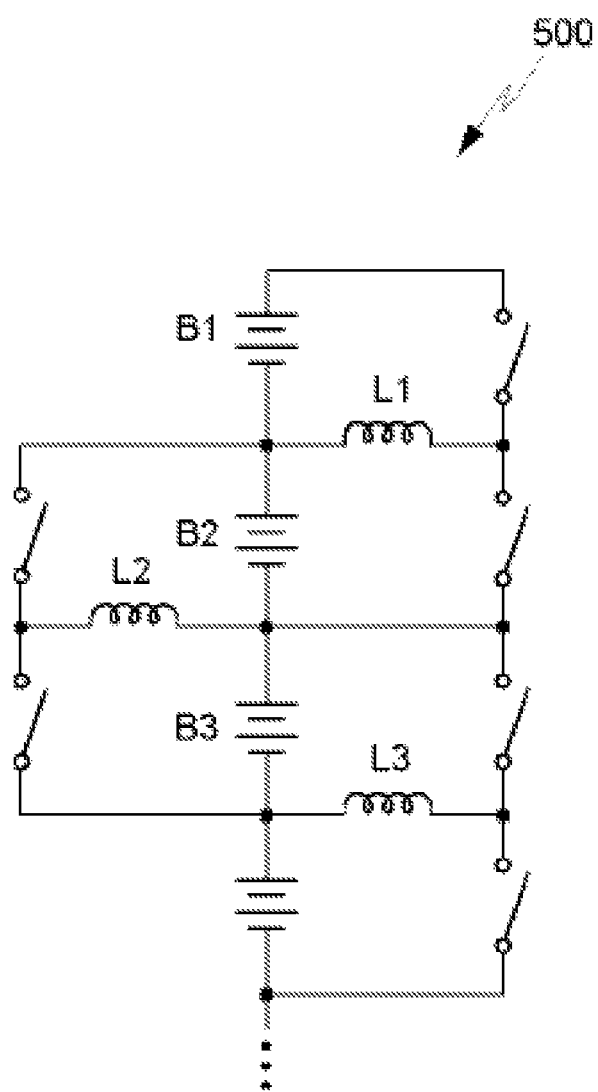
FIG. 5 is a diagram illustrating further still another example of an energy non-consumption type cell balancing circuit.

FIG. 5 is a diagram illustrating further still another example of an energy non-consumption type cell balancing circuit.

An energy non-consumption type cell balancing circuit 500 in FIG. 5 may maintain cell balancing on battery cells B1, B2 and B3 using a plurality of switches and inductors L1, L2 and L3. The energy non-consumption type cell balancing circuit 500 in FIG. 5 has a configuration in which the inductors L1, L2 and L3 are connected between the plurality of battery cells B1, B2 and B3, respectively, and the switches are connected between the battery cells respectively adjacent to the inductors L1, L2 and L3. The energy non-consumption type cell balancing circuit 500 in FIG. 5 may selectively perform charging of overcharged energy of the battery cells B1, B2, and B3 to the inductors L1, L2, and L3 and discharging of the charged energy of the battery cells B1, B2, and B3 to the inductors L1, L2, and L3 by switching operations of the switches.

Figure 6:
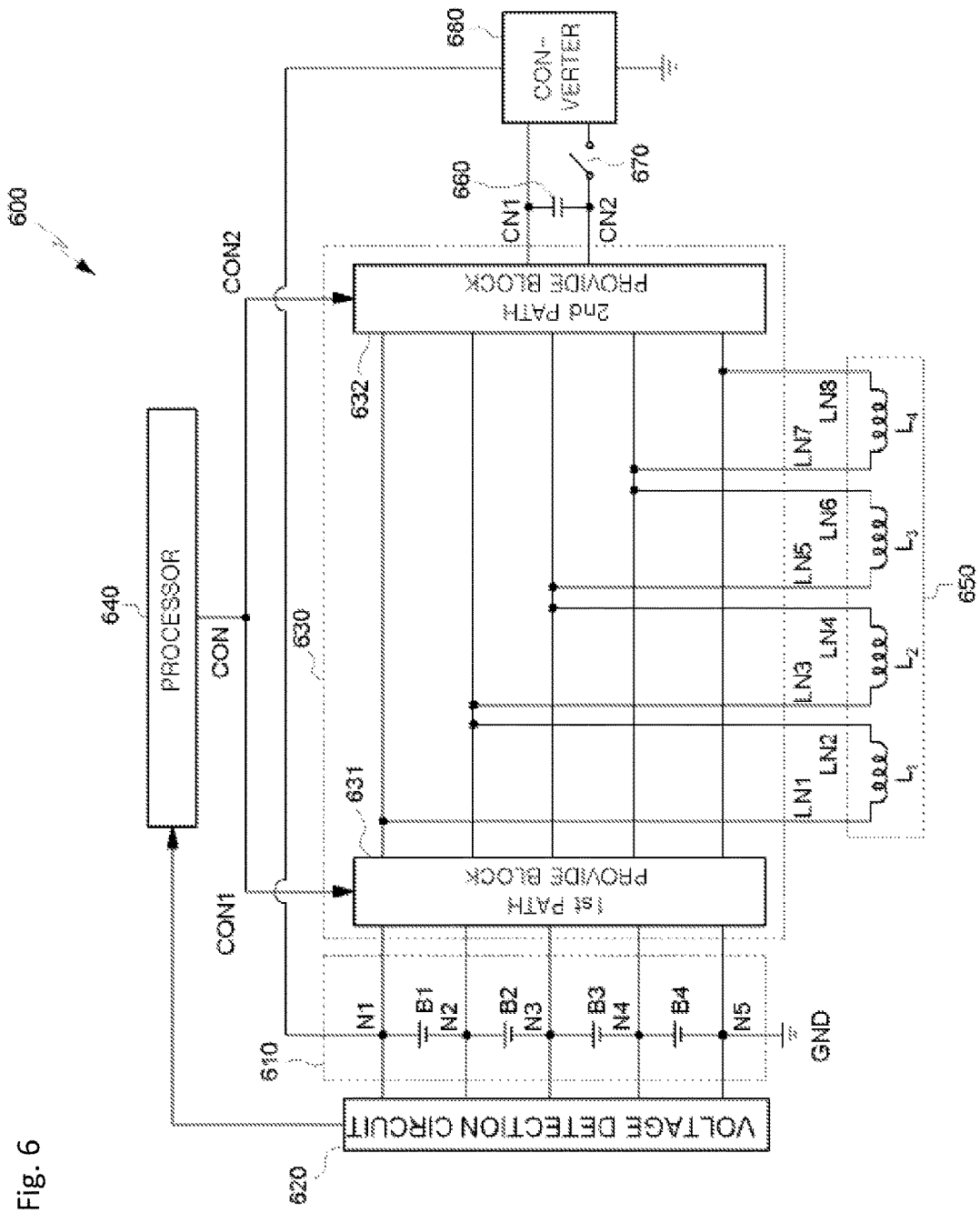
FIG. 6 is a block diagram exemplifying a preferred embodiment of a cell balancing system according to the present invention.

An embodiment of the energy non-consumption type cell balancing circuit according to the present invention may be realized as in the block diagram of FIG. 6.

In this embodiment, a cell balancing system 600 in FIG. 6 includes a battery pack 610, a voltage detection circuit 620, a cell balancing circuit 630, a processor 640, an inductor array 650, a capacitor 660, a switch 670, and a converter 680.

The battery pack 610 may be configured to include first to fourth battery cells B1, B2, B3, and B4 connected in series. The positive (+) electrode of the first battery cell B1 is connected to the converter 680 and is referred to as a first node N1. Connection points between the first battery cell B1 to the fourth battery cell B4 connected in series are referred to as a second node N2 to a fourth node N4, respectively. The negative (−) electrode of the fourth battery cell B4 is connected to a ground GND and is referred to as a fifth node N5. The first node N1 to the fifth node N5 are connected to each of the voltage detection circuit 620 and the cell balancing circuit 630.

The voltage detection circuit 620 is connected to the first node N1 to the fifth node N5 of the battery pack 610, detects a voltage of each of the four battery cells B1, B2, B3, and B4, and provides the voltages of the four battery cells B1, B2, B3, and B4 to the processor 640.

The inductor array 650 may include first to fourth inductors L1, L2, L3, and L4 corresponding to the battery cells B1, B2, B3, and B4, respectively. The first to fourth inductors L1, L2, L3, and L4 are an exemplary first energy storage element storing energy. Both terminals LN1 and LN2, LN3 and LN4, LN5 and LN6, and LN7 and LN8 of the first to fourth inductors L1, L2, L3, and L4 may be connected to both terminals of the corresponding battery cells B1, B2, B3, and B4, respectively, via the cell balancing circuit 630. The first to fourth inductors L1, L2, L3, and L4 are configured such that both terminals LN1 and LN2, LN3 and LN4, LN5 and LN6, and LN7 and LN8 are connected to both terminals CN1 and CN2 of the capacitor 660 via the cell balancing circuit 630. In the embodiment of FIG. 6, the first to fourth inductors L1, L2, L3, and L4 included in the inductor array 650 are configured such that the adjacent inductors share wirings between a first path provide block 631 and a second path provide block 632 in common. That is, the terminal LN2 of the first inductor L1 is connected to the same wiring as the terminal LN3 of the second inductor L2, the terminal LN4 of the second inductor L2 is connected to the same wiring as the terminal LN5 of the third inductor L3, and the terminal LN6 of the third inductor L3 is connected to the same wiring as the terminal LN7 of the fourth inductor L4. The terminal LN1 of the first inductor L1 and the terminal LN8 of the fourth inductor L4 are connected independently to different wirings between the first path provide block 631 and the second path provide block 632.

Both terminals CN1 and CN2 of the capacitor 660 are connected to the cell balancing circuit 630 and the converter 680, respectively. The capacitor 660 is connected in parallel between the cell balancing circuit 630 and the converter 680 and is an exemplary second energy storage element storing energy. In this embodiment, the case in which the number of capacitors is one has been described, but one or more capacitors may be connected in series or in parallel. The capacitor 660 stores energy delivered from the cell balancing circuit 630 and delivers the stored energy to the converter 680 via the switch 670. The switch 670 may be configured inside the converter 680 and includes a transistor. Further, the switch 670 may be configured to be switched according to a signal (for example, a PWM signal) provided from the processor 640.

The cell balancing circuit 630 may include the first path provide block 631 providing a path along which the energy of the overcharged battery cell among the battery cells B1, B2, B3, and B4 is delivered to the inductor array 650 which is the corresponding first energy storage element and the second path provide block 632 providing a path along which the energy stored in the inductor array 650 is delivered to the capacitor 660 which is the second energy storage element. In response to a mode signal (CON) output from the processor 640, the cell balancing circuit 630 provides a path for primarily storing the energy of the overcharged battery cell in the inductor corresponding to each battery cell and provides a path for collecting and secondarily storing the energy primarily collected from the inductors in the capacitor 660.

The converter 680 converts the energy collected from the capacitor 660 via the switch 670 and distributes the converted energy to the battery cells B1, B2, B3, and B4. The converter 680 may be configured to include a transformer converting the energy collected from the capacitor 660 into a suitable energy level and distributing the converted energy to the battery cells. That is, the converter 680 may be designed to include a primary coil to which the energy of the capacitor 660 is delivered and a secondary coil providing the induced energy to the battery pack 610.

The processor 640 determines whether each battery cell is overcharged by comparing the voltage of each of the battery cells B1, B2, B3, and B4 delivered from the voltage detection circuit 620 with a reference voltage preset in the inside. The processor 640 generates a mode signal CON according to the result obtained by determining whether each battery cell is overcharged and outputs the mode signal CON to control the cell balancing circuit 630. The mode signal CON may include a first mode signal CON1 and a second mode signal CON2 and may be a PWM (Pulse Width Modulation) signal. In this case, the first mode signal CON1 may be used as a signal that controls the cell balancing circuit 630 such that the overcharged energy of a battery cell is primarily stored in an inductor corresponding to the corresponding battery cell. More specifically, the first mode signal CON1 is provided to control switching of the first path provide block 631 of the cell balancing circuit 630. The second mode signal CON2 may be used as a signal that controls the cell balancing circuit 630 such that energy stored in the inductors is all collected and secondarily stored in the capacitor 660. More specifically, the second mode signal CON2 is provided to control switching of the second path provide block 632 of the cell balancing circuit 630. In correspondence with each battery cell, the first mode signal CON1 and the second mode signal CON2 are preferably provided when the first path provide block 631 is turned on in a state in which the second path provide block 632 is turned off and when the second path provide block 632 is turned on in a state in which the first path provide block 631 is turned off. That is, the first path provide block 631 and the second path provide block 632 may be sequentially turned on.

In this embodiment, the description has been made exemplifying the case in which the battery pack 610 includes the four battery cells B1, B2, B3, and B4 and the inductor array 650 includes the four inductors L1, L2, L3, and L4. However, the number of battery cells and the number of inductors according to this embodiment is not limited to four. The battery cells and the inductors of a number less than four or greater than four may be included according to the will of a manufacturer.

Figure 7:
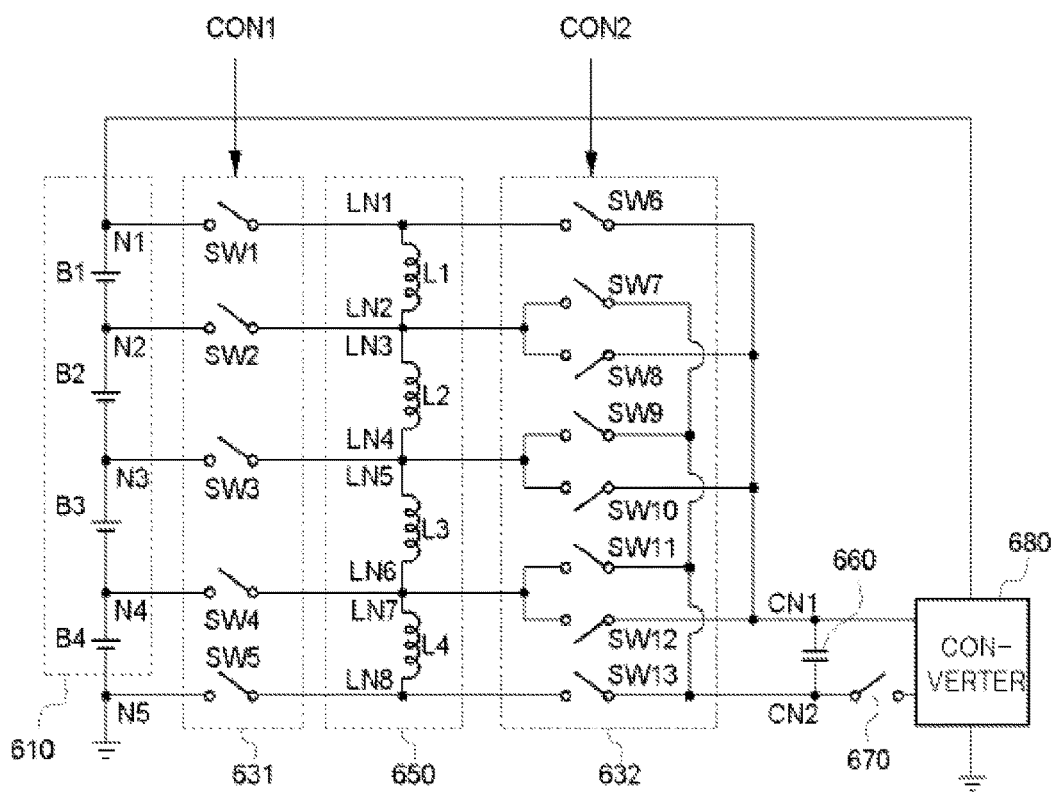
FIG. 7 is a circuit diagram exemplifying a detailed circuit of a part of the block of FIG. 6.

FIG. 7 is a diagram exemplifying a detailed circuit configuration of the cell balancing circuit 630 in FIG. 6.

In an embodiment of FIG. 7, a first path provide block 631 and a second path provide block 632 include a plurality of switches. The first path provide block 631 includes first to fifth switches SW1, SW2, SW3, SW4, and SW5 selectively connecting first to fifth nodes N1, N2, N3, N4, and N5 to first to fourth inductors L1, L2, L3, and L4 in response to the first mode signal CON1. The first to fifth switches SW1, SW2, SW3, SW4, and SW5 each include a transistor. For example, both terminals LN1 and LN2 of the first inductor L1 are connected to the first node N1 and the second node N2 via the first switch SW1 and the second switch SW2 so as to be connected to both terminals of the first battery cell B1, respectively. Both terminals LN3 and LN4 of the second inductor L2 are connected to the second node N2 and the third node N3 via the second switch SW2 and the third switch SW3 so as to be connected to both terminals of the second battery cell B2, respectively. Both terminals LN5 and LN6 of the third inductor L3 are connected to the third node N3 and the fourth node N4 via the third switch SW3 and the fourth switch SW4 so as to be connected to both terminals of the third battery cell B3, respectively. Both terminals LN7 and LN8 of the fourth inductor L4 are connected to the fourth node N4 and the fifth node N5 via the fourth switch SW4 and the fifth switch SW5 so as to be connected to both terminals of the fourth battery cell B4, respectively. The first mode signal CON1 selectively controls switching states of the first to fifth switches SW1, SW2, SW3, SW4, and SW5 such that the energy of the overcharged battery among the battery cells B1, B2, B3, and B4 is delivered and stored in the inductor corresponding to the corresponding battery cell.

The first switch SW1 and the second switch SW2 provide a path along which the energy of the overcharged first battery cell B1 is delivered to the first inductor L1 in response to the first mode signal CON1. For example, the first switch SW1 connects the first node N1 to the terminal LN1 of the first inductor L1 and the second switch SW2 connects the second node N2 to the terminal LN2 of the first inductor L1.

Likewise, the second switch SW2 and the third switch SW3 provide a path along which the energy of the overcharged second battery cell B2 is delivered to the second inductor L2. The third switch SW3 and the fourth switch SW4 provide a path along which the energy of the overcharged third battery cell B3 is delivered to the third inductor L3. The fourth switch SW4 and the fifth switch SW5 provide a path along which the energy of the overcharged fourth battery cell B4 is delivered to the fourth inductor L4.

The second path provide block 632 controls sixth to thirteen switches SW6, SW7, SW8, SW9, SW10, SW11, SW12, and SW13 selectively connecting both terminals LN1 and LN2, LN3 and LN4, LN5 and LN6, and LN7 and LN8 of first to fourth inductors L1, L2, L3, and L4 to both terminals CN1 and CN2 of the capacitor 660 in response to the second mode signal CON2. The second mode signal CON controls the sixth to thirteen SW6, SW7, SW8, SW9, SW10, SW11, SW12, and SW13 such that the energy stored in the inductors is delivered and stored in the capacitor 660.

The sixth switch SW6 and the seventh switch SW7 provide a path along which the energy stored in the first inductor L1 is delivered to the capacitor 660 in response to the second mode signal CON1. For example, the sixth switch SW6 connects the terminal LN1 of the first inductor L1 to the terminal CN1 of the capacitor 660 and the seventh switch SW7 connects the terminal LN2 of the first inductor L1 to the terminal CN2 of the capacitor 660.

Likewise, the eighth switch SW8 and the ninth switch SW9 provide a path along which the energy stored in the second inductor L2 is delivered to the capacitor 660. The tenth switch SW10 and the eleventh switch SW11 provide a path along which the energy stored in the third inductor L3 is delivered to the capacitor 660. The twelfth switch SW12 and the thirteen switch SW13 provide a path along which the energy stored in the fourth inductor L4 is delivered to the capacitor 660.

In the foregoing configuration, one end of the seventh switch SW7 and one end of the eighth switch SW8 are connected in parallel to a wiring commonly connected to the terminal LN2 of the first inductor L1 and the terminal LN3 of the second inductor L2 adjacent to each other, one end of the ninth switch SW9 and one end of the tenth switch SW10 are connected in parallel to a wiring commonly connected to the terminal LN4 of the second inductor L2 and the terminal LN5 of the third inductor L3 adjacent to each other, and one end of the eleventh switch SW11 and one end of the twelfth switch SW12 are connected in parallel to a wiring commonly connected to the terminal LN6 of the third inductor L3 and the terminal LN7 of the fourth inductor L4 adjacent to each other. One end of the sixth switch SW6 is connected to the terminal LN1 of the first inductor L1 and one end of the thirteen switch SW13 is connected to the terminal LN8 of the fourth inductor L4. Further, the other end of each of the sixth switch SW6, the eighth switch SW8, the tenth switch SW10, and the twelfth switch SW12 is commonly connected to the terminal CN1 of the capacitor 660 and the other end of each of the seventh switch SW7, the ninth switch SW9, the eleventh switch SW11, and the thirteen switch SW13 is commonly connected to the terminal CN2 of the capacitor 660.

In the embodiment of FIGS. 6 and 7, as described above, the voltage detection circuit 620 detects the voltage of each of the battery cells B1, B2, B3, and B4 included in the battery pack 610 and provides the voltage of each of the battery cells B1, B2, B3, and B4 to the processor 640. Further, the processor 640 determines whether each battery cell is overcharged by comparing the voltage of each of the battery cells B1, B2, B3, and B4 with the internal reference voltage. When there is the overcharged battery cell B1, B2, B3, or B4, cell balancing is performed in the embodiment of FIGS. 6 and 7.

For example, when the first battery cell B1 is overcharged, the processor 640 provides the first mode signal CON1 to turn on the first switch SW1 and the second switch SW2 of the first path provide block 631, so that the first switch SW1 and the second switch SW2 are turned on according to the first mode signal CON1. When the first switch SW1 and the second switch SW2 are turned on, the energy of the overcharged first battery cell B1 is delivered to the first inductor L1. At this time, the sixth switch SW6, the seventh switch SW7, and the eighth switch SW8 of the second path provide block 631 remain turned off according to the second mode signal CON2. Thereafter, the first switch SW1 and the second switch SW2 are turned off and the sixth switch SW6 and the seventh switch SW7 are turned on under the control of the processor 640. Then, the energy stored in the first inductor L1 is delivered to the capacitor 660. At this time, the switch 670 remains turned off. The energy delivered to the capacitor 660 is delivered to the converter 680 when the switch 670 is turned on and the converter 680 performs a DC-DC conversion operation and subsequently provides the energy for charge to the battery pack 610.

Figure 8:
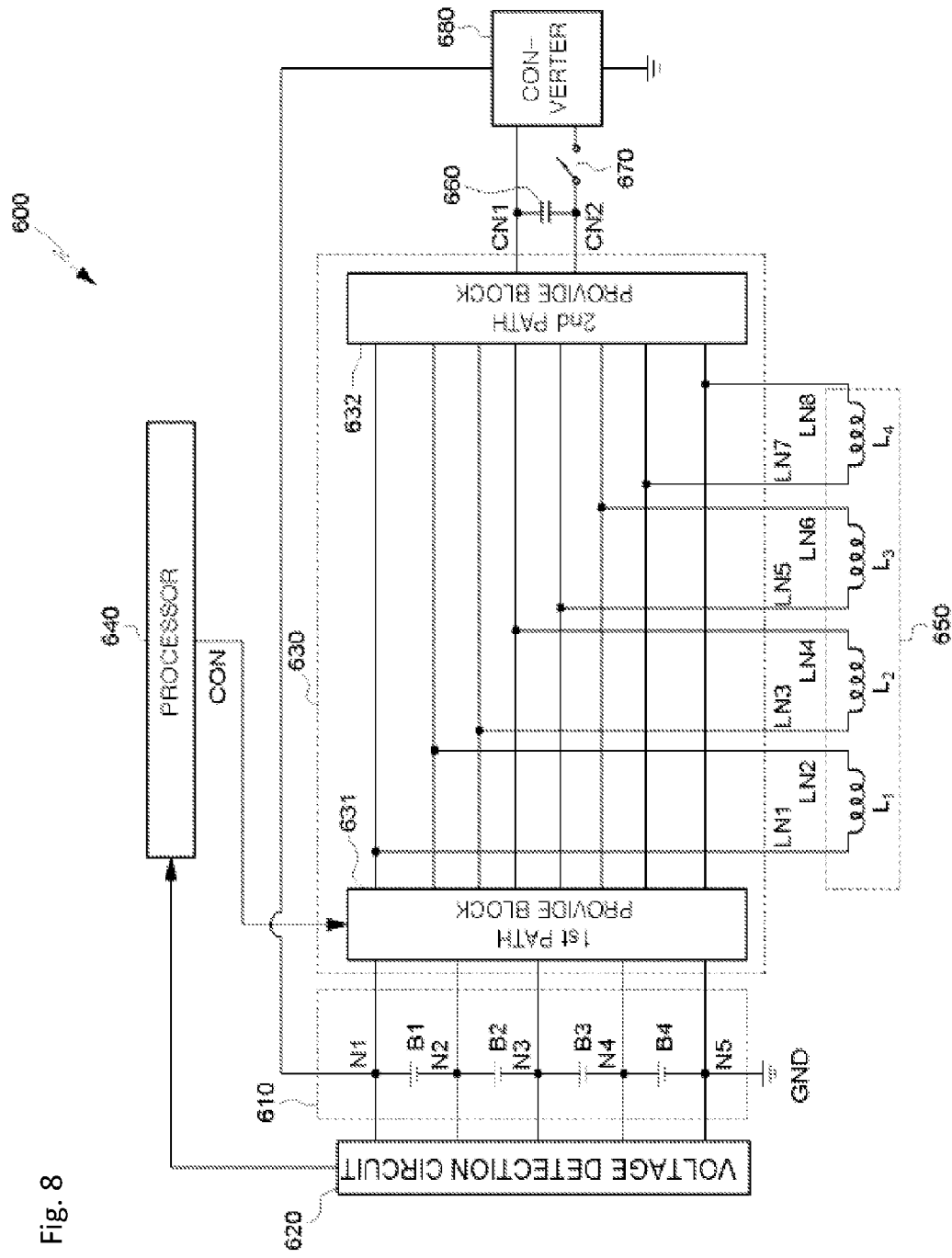
FIG. 8 is a block diagram exemplifying another preferred embodiment of the cell balancing system according to the present invention.

On the other hand, FIG. 8 is a block diagram exemplifying another embodiment of the cell balancing system according to the present invention. Compared to FIG. 6, in FIG. 8, there are differences in the configuration of the first path provide block 631, the configuration of the second path provide block 632, provision of the mode signal CON to the first path provide block 631 by the processor 640, independent connections of the terminals LN1 to LN8 of the first to fourth inductors L1, L2, L3, and L4 to wirings. The description of the same constituent elements of FIG. 8 as those of FIG. 6 will be omitted. The embodiment of FIG. 8 will be described with reference to FIG. 9.

Figure 9:
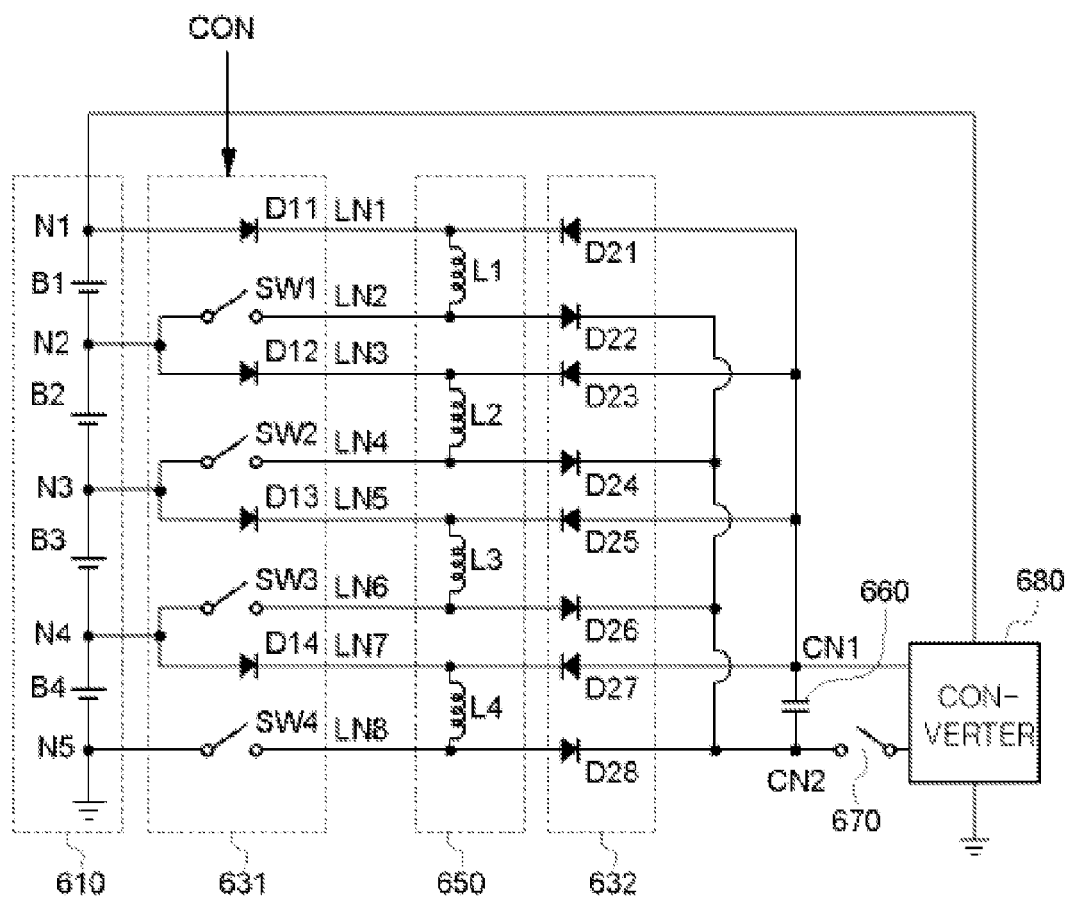
FIG. 9 is a circuit diagram differently exemplifying a detailed circuit of a part of the block of FIG. 8.

Referring to FIG. 9, the first path provide block 631 is configured to include diodes and switches and the second path provide block 632 is configured to include diodes.

The first path provide block 631 includes first to fourth diodes D11, D12, D13, and D14 and first to fourth switches SW1, SW2, SW3, and SW4. The first to fourth switches SW1, SW2, SW3, and SW4 each include a transistor. The first diode D11 and the first switch SW1 provide a unidirectional path along which the energy of the overcharged first battery cell B1 is delivered to the first inductor L1. The anode of the first diode D11 is connected to one terminal of the first battery cell B1, i.e., the first node N1 and the cathode of the first diode is connected to the terminal LN1 of the first inductor L1. The first switch SW1 is located between the second node N2 formed on one side of the first battery cell B1 and the terminal LN2 of the first inductor L1 and switches connection between the second node N2 and the terminal LN2 of the first inductor L1 in response to the mode signal CON.

Likewise, the second diode D12 and the second switch SW2 provide a unidirectional path along which the energy of the overcharged second battery cell B2 is delivered to the second inductor L2. The third diode D13 and the third switch SW3 provide a unidirectional path along which the energy of the overcharged third battery cell B3 is delivered to the third inductor L3. The fourth diode D14 and the fourth switch SW4 provide a unidirectional path along which the stored energy of the overcharged fourth battery cell B4 is delivered to the fourth inductor L4.

The second path provide block 632 includes fifth to twelfth diodes D21, D22, D23, D24, D25, D26, D27, and D28. The fifth to twelfth diodes D21, D22, D23, D24, D25, D26, D27, and D28 are paired two by two so that a pair of diodes corresponds to one inductor and provide a path along which the energy stored in the corresponding inductor is delivered to the capacitor 660.

For example, the fifth diode D21 and the sixth diode D22 correspond to the first inductor L1 and provide a path along which the energy stored in the first inductor L1 is delivered to the capacitor 660. Accordingly, the anode of the fifth diode D21 is connected to the terminal CN1 of the capacitor 660 and the cathode of the fifth diode D21 is connected to the terminal LN1 of the first inductor L1. The anode of the sixth diode D22 is connected to the terminal LN2 of the first inductor L1 and the cathode of the sixth diode D22 is connected to the terminal CN2 of the capacitor 660.

Likewise, the seventh diode D23 and the eighth diode D24 correspond to the second inductor L2 and provide a path along which the energy stored in the second inductor L2 is delivered to the capacitor 660. The ninth diode D25 and the tenth diode D26 correspond to the third inductor L3 and provide a path along which the energy stored in the third inductor L3 is delivered to the capacitor 660. The eleventh diode D27 and the twelfth diode D28 correspond to the fourth inductor L4 and provide a path along which the energy stored in the fourth inductor L4 is delivered to the capacitor 660.

The first to fourth inductors L1, L2, L3, and L4 are connected in parallel to the capacitor 660. Thus, the energy stored in the first to fourth inductors L1, L2, L3, and L4 may be all collected in the capacitor 660. In each inductor, two diodes are installed along the delivery path of the energy to the capacitor 660 so that a current with a direction property flows in one direction, and thus the energy stored in the inductor may be delivered a capacitor direction.

Figure 10:
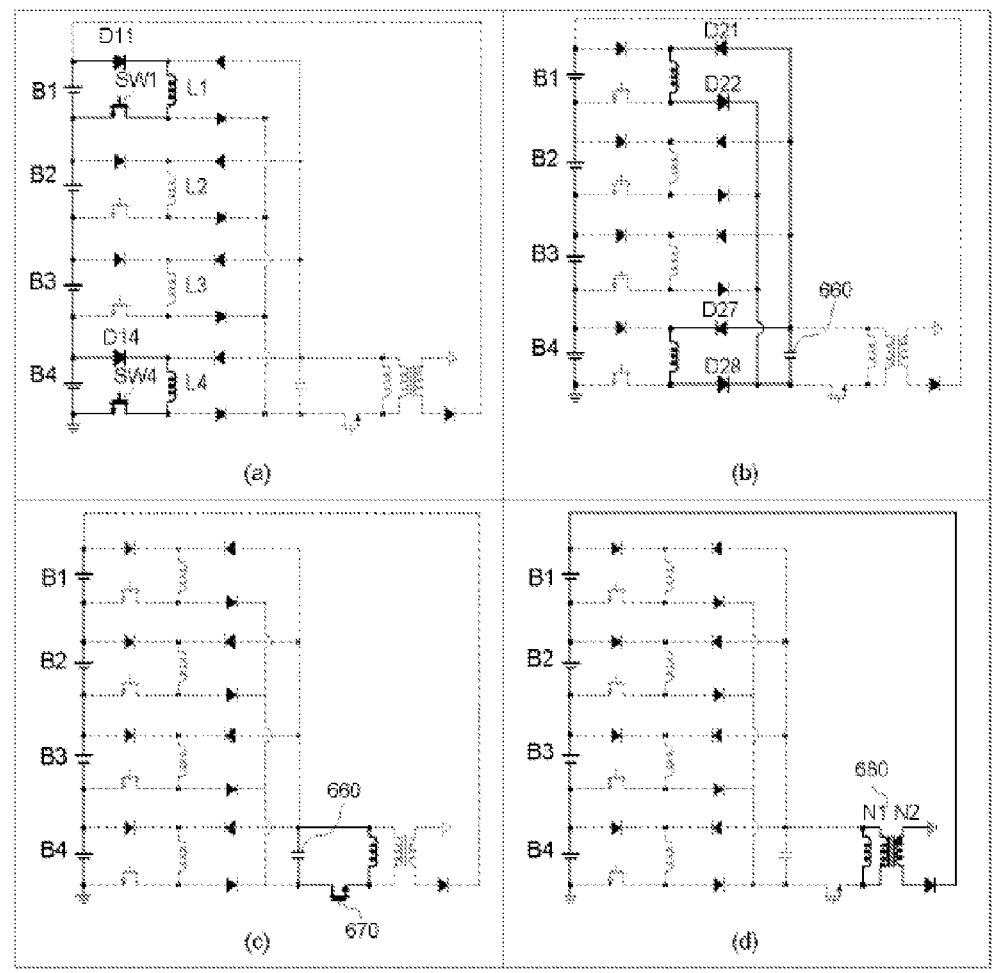
FIG. 10 is a diagram for describing an operation of the embodiment of FIG. 9.

FIG. 10 is a diagram for describing an operation of the cell balancing system configured as in FIG. 9 according to an embodiment. A cell balancing system according to an embodiment of FIG. 10 may operate according to four classified modes, as in (a) to (d) of FIG. 10. In this embodiment, the description will be made exemplifying a case in which the first battery cell B1 and the fourth battery cell B4 are overcharged.

Referring to (a) of FIG. 10, in a first operation mode, the processor 640 determines that the first battery cell B1 and the fourth battery cell B4 are overcharged and provides a mode signal CON to a first path provide block 631 so that the first switch SW1 and the fourth switch SW4 are turned on and the second switch SW2 and the third switch SW3 are turned off. The first battery cell B1, the first diode D11, the first inductor L1, and the first switch SW1 form a closed loop to make an energy delivery path. The energy of the overcharged first battery cell B1 is delivered along the energy delivery path and is stored in the first inductor L1. Likewise, the fourth battery cell B4, the fourth diode D14, the fourth inductor L4, and the fourth switch SW4 form a closed loop to make an energy delivery path. The energy of the overcharged fourth battery cell B4 is delivered along the energy delivery path and is stored in the fourth inductor L4.

Referring to (b) of FIG. 10, in a second operation mode, the processor 640 provides a mode signal CON so that the turned-on first switch SW1 and the turned-on fourth switch SW4 of the first path provide block 631 are turned off. The first inductor L1 and the fourth inductor L4 are connected in parallel to the capacitor 660 and four diodes D21, D22, D27, and D28 provide a unidirectional property to current flow. Therefore, the energy stored in the first inductor L1 and the fourth inductor L4 is all delivered to the capacitor 660.

Referring to (c) of FIG. 10, in a third operation mode, the processor 640 provides a mode signal CON so that the switch 670 is turned on. The energy with which the capacitor 660 is charged is delivered to a coil included in the converter 680.

Referring to (d) of FIG. 10, in a fourth operation mode, the converter 680 may provide energy induced to the secondary coil by the energy of the primary coil to the first battery cell B1 to the fourth battery cell B4 of the battery pack 610.

To sum up the operation modes of FIG. 10, the voltage detection circuit 620 detects an overcharged battery cell, activates the switches of the first path provide block 631 connected to the overcharged battery cell, and primarily stores the energy of the overcharged battery cell in the corresponding inductor. Thereafter, the energy stored in the inductor is secondarily stored in one capacitor 660 via a second path provide block 632. Thereafter, the converter 680 converts the energy stored in the capacitor 660 and provides the converted energy to the battery pack 610. The energy provided to the battery pack 610 may be distributed to the four battery cells B1 to B4 connected in series, and thus the four battery cells B1 to B4 can be charged.

The four operation modes have been sequentially described to help understanding of the operation procedure of the cell balancing system according to the foregoing embodiment. However, by adjusting the configurations and operations of the path provide blocks, the first and third operation modes may be simultaneously progressed and the second and fourth operation modes may be also simultaneously progressed.

Figure 11:
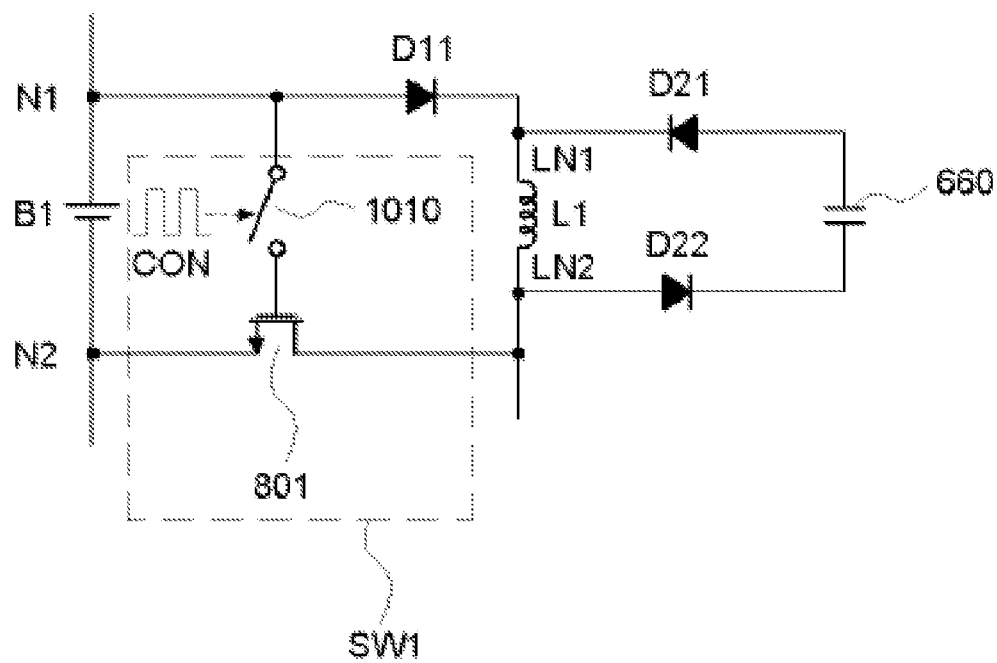
FIG. 11 is a diagram illustrating an embodiment of a switch of a first path provide block illustrated in FIG. 9.

FIG. 11 is a diagram illustrating an embodiment of a switch of the first path provide block 631 illustrated in FIG. 9. Referring to FIG. 11, a first switch SW1 includes a transistor 801 and a control switch 1010.

The transistor 801 includes a control terminal, a first terminal, and a second terminal. The control terminal is connected to one end of the control switch 1010, the first terminal is connected to a second node N2, and the second terminal is connected to a terminal LN2 of the first inductor L1.

The control switch 1010 is connected between the control terminal of the first node N1 of the transistor 801 and may be turned on or off according to a mode signal CON of a PWM form provided from the processor 640. The control switch 1010 switches connection of the first node N1 to the control terminal of the transistor 801 in response to the mode signal CON of the PWM form.

When the first battery cell B1 is overcharged, the control switch 1010 is turned on under the control of the processor 640. When the energy of the overcharged battery cell is delivered via the turned-on control switch 1010, a voltage level to be applied to a gate of the transistor 801 increases. Therefore, the transistor 801 is turned on. Thus, a closed loop is formed, as in illustrated (a) of FIG. 10, and the first path provide block 631 may provide a path along which the energy of the overcharged first battery cell B1 is delivered to the corresponding inductor L1.

Since the configurations and operations of other switches SW2, SW3, and SW4 of the first path provide block 631 are the same as the configuration and operation of the first switch SW1, the detailed description will be omitted.

Figure 12:
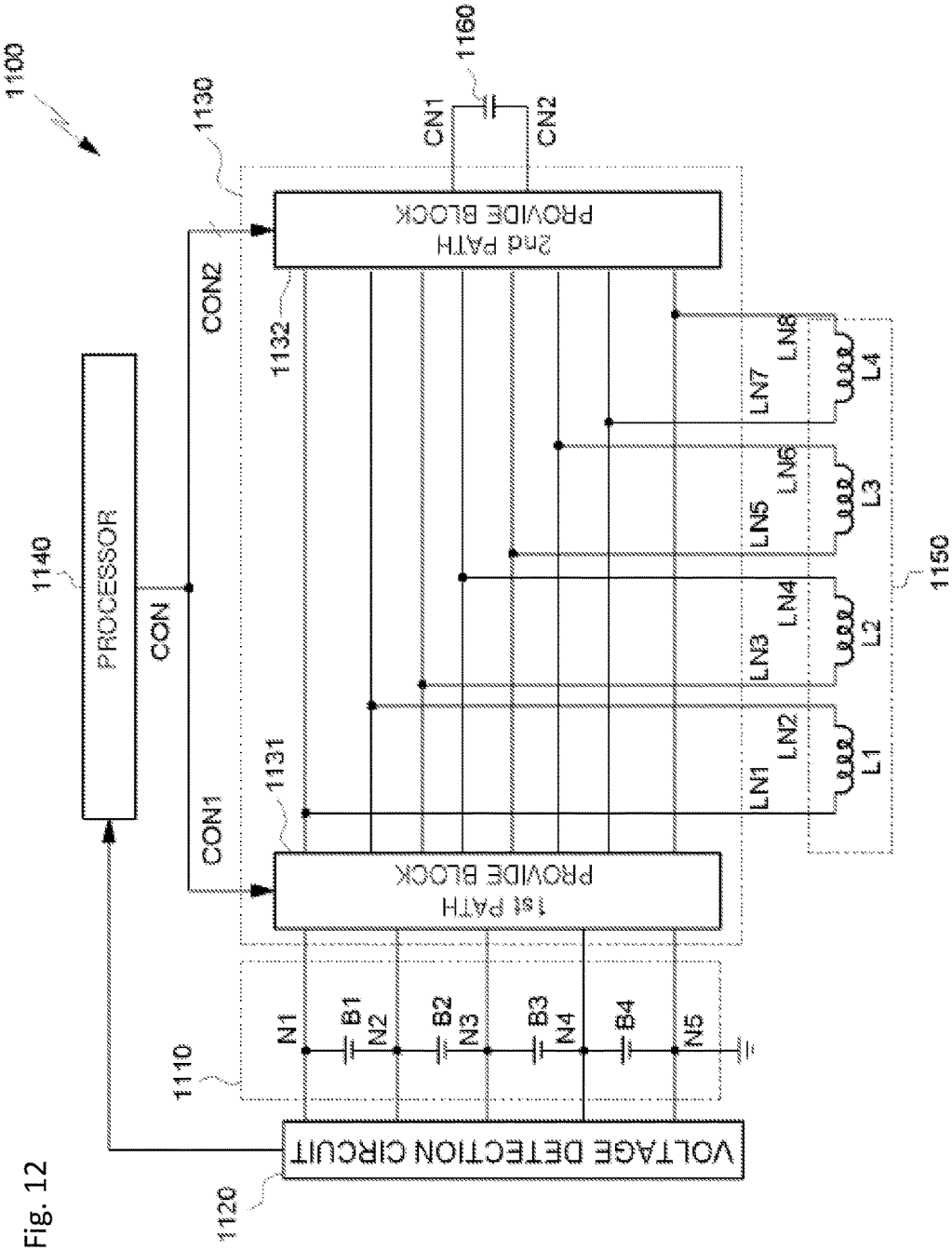
FIG. 12 is a diagram illustrating still another preferred embodiment of the cell balancing system according to the present invention.

FIG. 12 is a diagram illustrating still another embodiment of the cell balancing system according to the present invention. The embodiment of FIG. 12 is realized such that an energy delivery operation is performed in both cell-to-cell directions, energy of an overcharged battery cell is collected, and the collected energy is delivered directly to an undercharged battery cell.

A cell balancing system 1100 embodied as in FIG. 12 includes a battery pack 1110, a voltage detection circuit 1120, a cell balancing circuit 1130, a processor 1140, an inductor array 1150, and a capacitor 1160. The cell balancing circuit 1130 includes a first path provide block 1131 and a second path provide block 1132.

In the embodiment of FIG. 12, since the battery pack 1110 and the voltage detection circuit 1120 are the same as those of the embodiment of FIG. 6, the repeated description will be omitted. In the embodiment of FIG. 12, compared to FIG. 6, there are differences in the configuration of the first path provide block 1131, the configuration of the second path provide block 1132, and independent connection of terminals LN1 to LN8 of inductors L1, L2, L3, and L4 to wirings. The embodiment of FIG. 12 will be described with reference to FIG. 13.

Figure 13:
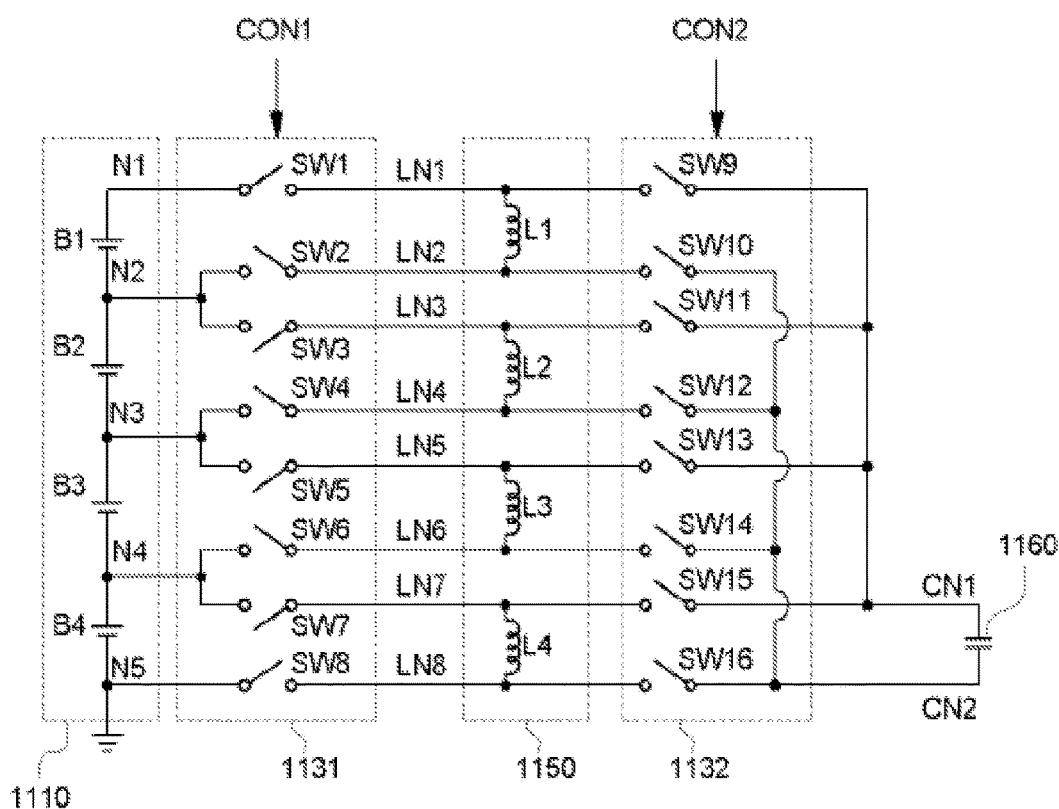
FIG. 13 is a circuit diagram exemplifying a detailed circuit of a part of the block of FIG. 12.

Referring to FIGS. 12 and 13, the first path provide block 1131 and the second path provide block 1132 may include a plurality of switches. The switches described in FIG. 11 may be used as the switches. In response to a mode signal CON, the first path provide block 1131 and the second path provide block 1132 selectively provide a path along which energy of an overcharged battery cell is collected to a capacitor 1160 via an inductor or a path along which the energy stored in the capacitor 1160 is provided to an undercharged battery cell via an inductor. The mode signal CON may be a PWM signal and includes a first mode signal CON1 and a second mode signal CON2.

The first path provide block 1131 includes first to eighth switches SW1, SW2, SW3, SW4, SW5, SW6, SW7, and SW8 selectively connecting both terminals of first to fourth battery cells B1, B2, B3, and B4 to both terminals of corresponding inductors L1, L2, L3, and L4 in response to the first mode signal CON1. Through switching operations of the first to eighth switches SW1, SW2, SW3, SW4, SW5, SW6, SW7, and SW8 according to the first mode signal CON1, energy of an overcharged battery cell among the first to fourth battery cells B1, B2, B3, and B4 may be stored in the corresponding inductor or the energy stored in the inductor may be provided to the corresponding battery cell. The first mode signal CON1 may be differently provided according to the first to eighth switches SW1, SW2, SW3, SW4, SW5, SW6, SW7, and SW8. A battery cell selected among the first to fourth battery cells B1, B2, B3, and B4 may provide energy to the inductor in correspondence with overcharging and may receive energy of the inductor in correspondence with undercharging.

In response to the first mode signal CON1, the first switch SW1 and the second switch SW2 provide a path along which energy of the overcharged first battery cell B1 is stored in the first inductor L1 and the first battery cell B1 is charged with energy collected from the capacitor 1160 and stored in the first inductor L1. For example, the first switch SW1 connects the first node N1 to the terminal LN1 of the first inductor L1 and the second switch SW2 connects the second node N1 to the terminal LN2 of the first inductor L1. Likewise, the third switch SW3 and the fourth switch SW4 provide an energy delivery path between the second battery cell B2 and the second inductor L2. The fifth switch SW5 and the sixth switch SW6 provide an energy delivery path between the third battery cell B3 and the third inductor L3. The seventh switch SW7 and the eighth switch SW8 provide an energy delivery path between the fourth battery cell B4 and the fourth inductor L4.

The second path provide block 1132 includes ninth to sixteenth switches SW9, SW10, SW11, SW12, SW13, SW14, SW15, and SW16 selectively connecting both terminals LN1 and LN2, LN3 and LN4, LN5 and LN6, and LN7 and LN8 of the first to fourth inductors L1, L2, L3, and L4 to both terminals CN1 and CN2 of the capacitor in response to the second mode signal CON2. Through switching operations of the ninth to sixteenth switches SW9, SW10, SW11, SW12, SW13, SW14, SW15, and SW16 according to the second mode signal CON2, the energy of the inductors L1, L2, L3, and L4 may be stored in the capacitor 1160 or the energy of the capacitor 1160 may be stored in the inductor corresponding to an undercharged battery cell. The second mode signal CON2 may be differently provided according to the ninth to sixteenth switches SW9, SW10, SW11, SW12, SW13, SW14, SW15, and SW16.

The ninth switch SW9 and the tenth switch SW10 provide a path along which the energy stored in the overcharged first inductor L1 is stored in the capacitor 1160 in response to the second mode signal CON2. The ninth switch SW9 and the tenth switch SW10 provide a path along which the energy collected from the capacitor 1160 is delivered to the first inductor L1 corresponding to the first battery cell B1 in response to the second mode signal CON2. For example, the ninth switch SW9 connects the terminal LN1 of the first inductor L1 to the terminal CN1 of the capacitor 1160 and the tenth switch SW10 connects the terminal LN2 of the first inductor L1 to the terminal CN2 of the capacitor 1160.

Likewise, the eleventh switch SW11 and the twelfth switch SW12 provide an energy delivery path between the second inductor L2 and the capacitor 1160. The thirteenth switch SW13 and the fourteenth switch SW14 provide an energy delivery path between the third inductor L3 and the capacitor 1160. The fifteenth switch SW15 and the sixteenth switch SW16 provides an energy delivery path between the fourth inductor L4 and the capacitor 1160.

In the case of the embodiment of FIGS. 6 and 8, the energy stored in the capacitor 660 is delivered directly to the battery pack 610 via the converter 680. Conversely, in the embodiment of FIGS. 12 and 13, there is a difference in that the energy stored in the capacitor 1160 is delivered to the battery cell 1110 via the second path provide block 1132 and the first path provide block 1131.

Figure 14:
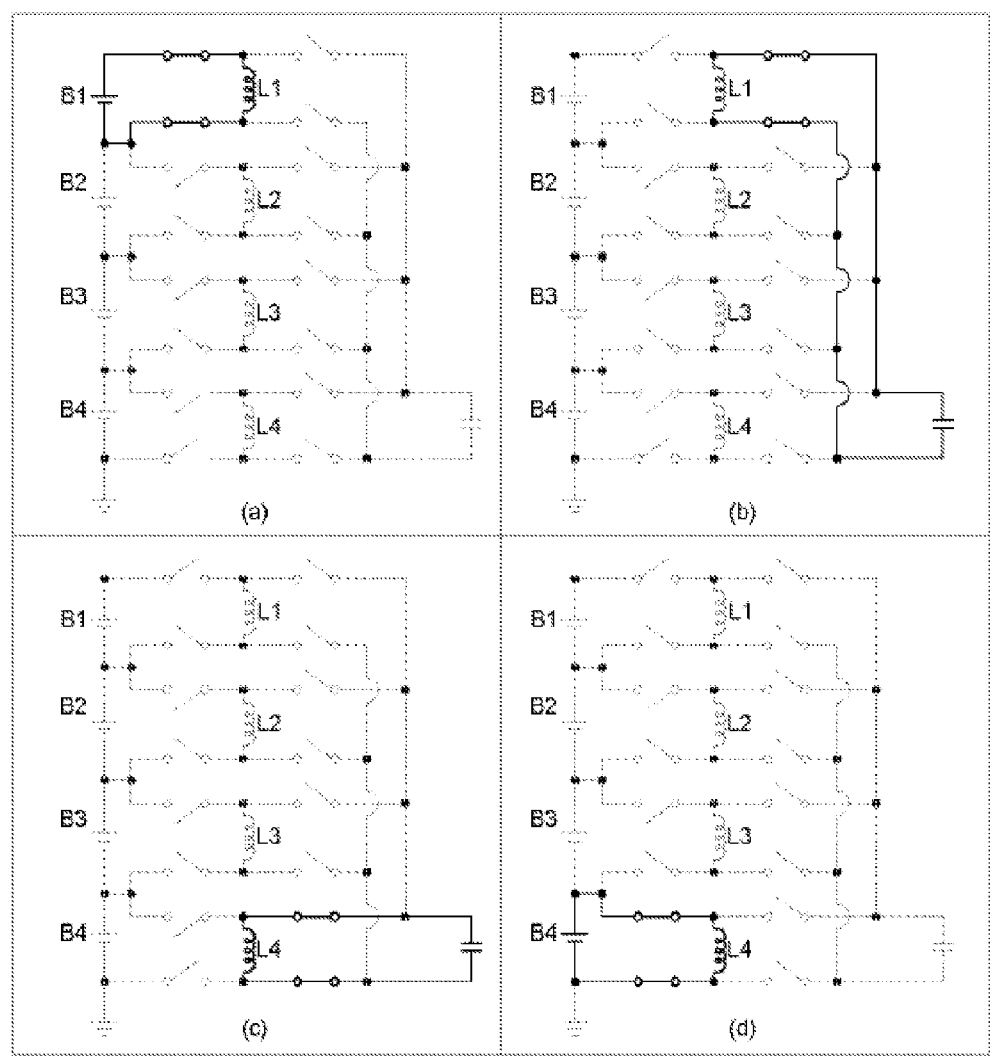
FIG. 14 is a circuit diagram for describing an operation of FIG. 13.

FIG. 14 is a diagram for describing an operation of the cell balancing system illustrated in FIG. 13. The cell balancing system according to this embodiment operates according to four classified modes. In this embodiment, the description will be made exemplifying a case in which the first battery cell B1 is overcharged and the fourth battery cell B4 is undercharged.

Referring to (a) of FIG. 13, in a first operation mode, the processor 1140 provides the first mode signal CON1 to the first path provide block 1131 so that the first switch SW1 and the second switch SW2 are turned on and the third switch SW3 and the sixth switch SW6 are turned off in correspondence with the case in which the first battery cell B1 is overcharged. Further, the processor 1140 provides the second mode signal CON2 to the second path provide block 1132 so that the switches SW9 to SW16 are turned off. The first battery cell B1, the first switch SW1, the first inductor L1, and the second switch SW2 form a closed loop to make an energy delivery path. Accordingly, the energy of the overcharged first battery cell B1 is delivered along the energy delivery path and is stored in the first inductor L1.

Referring to (b) of FIG. 13, in a second operation mode, the processor 1140 provides the first mode signal CON1 to the first path provide block 1131 so that the first switch SW1 and the second switch SW2 are turned off and provides the second mode signal CON2 to the second path provide block 1132 so that the ninth switch SW9 and the tenth switch SW10 are turned on. The first inductor L1, the ninth switch SW9, the capacitor 1160, and the tenth switch SW10 form a closed loop to make an energy delivery path. Accordingly, the energy stored in the first inductor L1 is delivered along the energy delivery path and is stored in the capacitor 1160.

Referring to (c) of FIG. 13, in a third operation mode, the processor 1140 determines that the fourth battery cell B4 is undercharged and provides the second mode signal CON2 to the second path provide block 1132 so that the fifteenth switch SW15 and the sixteenth switch SW16 are turned on and the ninth switch SW9 to the fourteenth switch SW14 are turned off. Further, the processor 1140 provides the first mode signal CON1 to the first path provide block 1131 so that the switches SW1 to SW8 are turned off. The capacitor 1160, the fifteenth switch SW15, the fourth inductor L4, and the sixteenth switch SW16 form a closed loop to make an energy delivery path. Accordingly, the energy stored in the capacitor 1160 is delivered to the fourth inductor L4. The fourth inductor L4 is an inductor corresponding to the undercharged fourth battery cell B4.

Referring to (d) of FIG. 13, in a fourth operation mode, the processor 1140 provides the first mode signal CON1 to the first path provide block 1131 so that the seventh switch SW7 and the eighth switch SW8 are turned on and the first switch SW1 to the sixth switch SW6 are turned off. Further, the processor 1140 provides the second mode signal CON2 to the second path provide block 1132 so that the ninth switch SW9 to the sixteenth switch SW16 are turned off. The fourth inductor L4, the seventh switch SW7, the fourth battery cell B4, and the eighth switch SW8 form a closed loop to make an energy delivery path. Accordingly, the energy stored in the fourth inductor L4 may be delivered to the fourth battery cell B4 to be distributed.

The cell balancing system according to this embodiment may operate in both cell-to-cell directions, as in FIG. 14. Therefore, since a battery cell of the battery pack does not deliver the collected energy to an adjacent battery cell unlike the cell-to-cell method of the related art, but the collected energy may be delivered directly to the undercharged battery cell, it is possible to shorten a time necessary for cell balancing. This method has an advantage of miniaturization since it is not necessary to use an external DC/DC converter.

Figure 15:
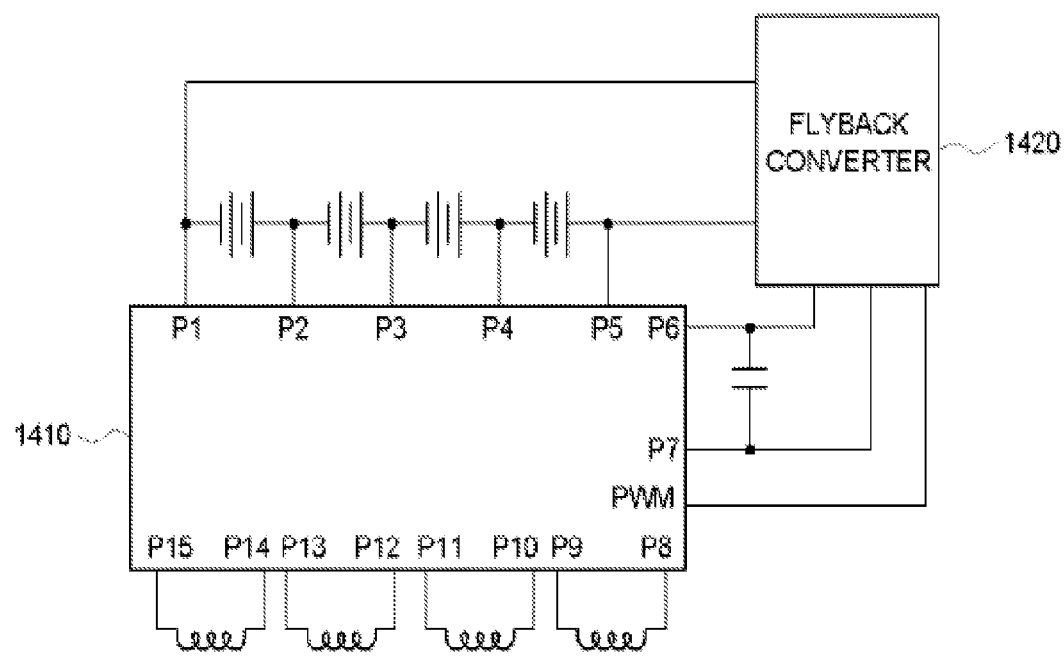
FIG. 15 is a diagram exemplifying realization by an integrated circuit according to an embodiment of the present invention.

FIG. 15 is a diagram illustrating an embodiment of a cell balancing system in which the cell balancing circuit is realized by an integrated circuit. The integrated circuit in FIG. 15 is an exemplary integrated circuit corresponding to the embodiment of FIGS. 6 to 10. Referring to FIG. 15, an integrated circuit 1410 corresponds to the cell balancing circuit 630 in FIG. 6. The integrated circuit 1410 may further includes a voltage detection circuit and a processor and performs cell balancing on four external battery cells.

More specifically, the integrated circuit 1410 may include first to fifth pins P1, P2, P3, P4, and P5 connected to four battery cells connected in series to the outside, sixth and seventh pins P6 and P7 connected to an external capacitor, eighth to fifteenth pins P8, P9, P10, P11, P12, P13, P14, and P15 connected to four external inductors, and a PWM pin outputting a PWM signal. The first to fifth pins P1, P2, P3, P4, and P5 correspond to the first to fifth nodes N1, N2, N3, N4, and N5 in FIG. 6, respectively. The sixth and seventh pins P6 and P7 correspond to both terminals CN1 and CN2 of the capacitor in FIG. 6. The eighth to fifteenth pins P8, P9, P10, P11, P12, P13, P14, and P15 correspond to both terminals LN1, LN2, LN3, LN4, LN5, LN6, LN7, and LN8 of the inductors in FIG. 6, respectively.

A flyback converter 1420 may include the converter 680 and the switch 670 in FIG. 6. The PWM pin of the integrated circuit 1410 is a pin configured to provide a PWM signal to the flyback converter 1420.

In this embodiment, the case in which the integrated circuit performs the cell balancing on four battery cells has been exemplified. However, the integrated circuit may be realized to perform cell balancing on four or more battery cells or four or less battery cells.

On the other hand, an integrated circuit performing cell balancing on a specific number of battery cells may be used to form a module. When the module is formed using the integrated circuit, a plurality of integrated circuits may be configured as one module. Therefore, the number of battery cells to be subjected to the cell balancing may be extended in proportion to the number of integrated circuits included in the module.

Figure 16:
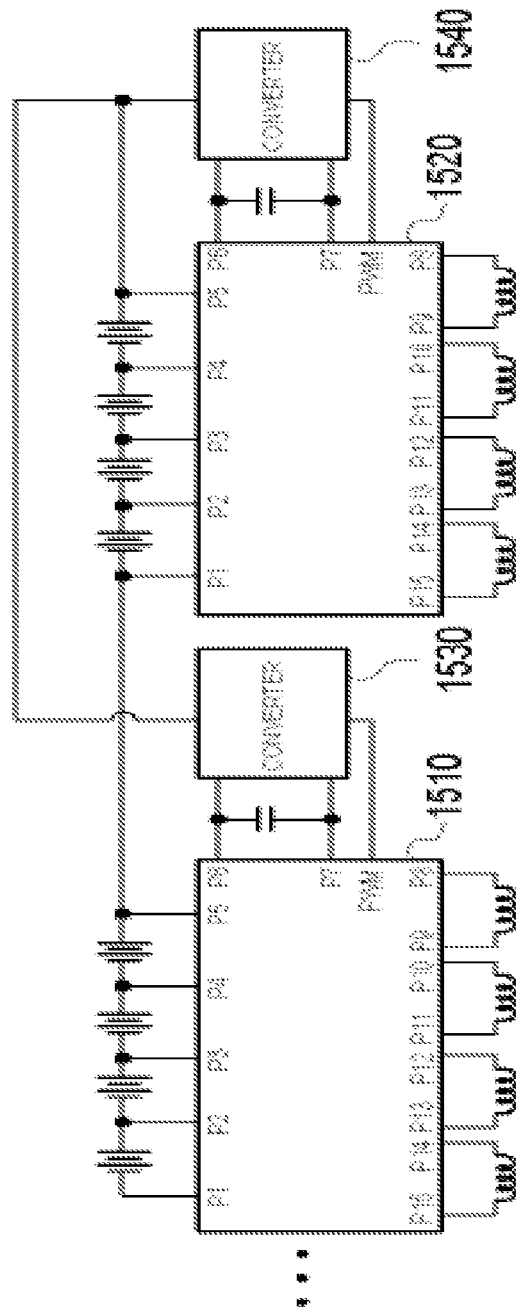
FIG. 16 is a diagram exemplifying realization of a module according to an embodiment of the present invention.

FIG. 16 is a diagram illustrating an embodiment of a cell balancing system realizing a module that includes two integrated circuits 1510 and 1520. In the embodiment of FIG. 16, when the two integrated circuits 1510 and 1520 performing the cell balancing on four battery cells are used, the battery cells to be subjected to the cell balancing is doubled, and thus eight battery cells may be shown to be subjected to the cell balancing. In the embodiment of FIG. 16, the case in which two integrated circuits are configured as the module has been exemplified. However, by configuring a module using three or more integrated circuits, as necessary, it is possible to extend the number of battery cells to be subjected to cell balancing.

Although the technical spirit of the present invention have been described for illustrative purposes with reference to the accompanying drawings, the preferred embodiments of the present invention are merely exemplified and do not limit the present invention. It should be apparent to those skilled in the art that various modifications, additions and substitutions are possible, without departing from the scope and the technical spirit of the invention as disclosed in the accompanying claims.

What is claimed is:

1. A cell balancing integrated circuit comprising:
   a first path provide block configured to provide a first energy delivery path having a unidirectional property in which energy is delivered from at least one battery cell to at least one first energy storage element, and
   a second path provide block configured to provide a second energy delivery path having a unidirectional property in which energy is delivered from at least the one first energy storage element to a second energy storage element.

2. The cell balancing integrated circuit according to claim 1, wherein a converter configured to convert energy of the second energy storage element is used and the energy is provided from the converter to at least the one battery cell.

3. The cell balancing integrated circuit according to claim 1, wherein the first energy storage element is an inductor and the second energy storage element is a capacitor.

4. The cell balancing integrated circuit according to claim 3,
   wherein the first path provide block includes a plurality of first switches configured to switch delivery of energy of the overcharged battery cell to the corresponding inductor in response to a mode signal, and
   wherein the second path provide block includes a plurality of second switches configured to switch delivery of energy stored in the inductor to the capacitor in response to the mode signal.

5. The cell balancing integrated circuit according to claim 4, wherein the plurality of first switches and the plurality of second switches are configured to be sequentially turned on.

6. The cell balancing integrated circuit according to claim 4, wherein the mode signal is a pulse width modulation signal (PWM).

7. The cell balancing integrated circuit according to claim 3,
   wherein the first path provide block includes a diode and a switch providing the first energy delivery path of a unidirectional property along which energy of the overcharged battery cell is delivered to the corresponding inductor in response to a mode signal, and
   wherein the second path provide block includes a diode providing the second energy delivery path of a unidirectional property along which energy stored in the inductor is delivered to the capacitor.

8. A cell balancing integrated circuit comprising:
   a first path provide block configured to provide a first energy delivery path along which energy between at least battery cell and at least one first energy storage element is deliverable in both directions and the energy is delivered in one direction selected by a mode signal, and
   a second path provide block configured to provide a second energy delivery path along which energy between at least the one first energy storage element and a second energy storage element is deliverable in both directions and the energy is delivered in one direction selected by the mode signal.

9. The cell balancing integrated circuit according to claim 8,
   wherein, according to the mode signal, the first path provide block delivers the energy from the battery cell to the first energy storage element in correspondence with the overcharged battery cell and delivers the energy from the first energy storage element to the battery cell in correspondence with the undercharged battery cell, and
   wherein, according to the mode signal, the second path provide block delivers the energy from the first energy storage element to the second energy storage element in correspondence with the overcharged battery cell and delivers the energy from the second energy storage element to the first energy storage element in correspondence with the undercharged battery cell.

10. The cell balancing integrated circuit according to claim 8, wherein the first energy storage element is an inductor and the second energy storage element is a capacitor.

11. The cell balancing integrated circuit according to claim 10,
   wherein the first path provide block includes a plurality of first switches configured to switch delivery of energy of the overcharged battery cell to the corresponding inductor in response to a mode signal, and
   wherein the second path provide block includes a plurality of second switches configured to switch delivery of energy stored in the inductor to the capacitor in response to the mode signal.

12. The cell balancing integrated circuit according to claim 11, wherein the plurality of first switches and the plurality of second switches are configured to be sequentially turned on.

13. The cell balancing integrated circuit according to claim 11, wherein the mode signal is a pulse width modulation signal (PWM).

14. The cell balancing integrated circuit according to claim 10,
   wherein the first path provide block includes a diode and a switch providing the first energy delivery path of a unidirectional property along which energy of the overcharged battery cell is delivered to the corresponding inductor in response to a mode signal, and
   wherein the second path provide block includes a diode providing the second energy delivery path of a unidirectional property along which energy stored in the inductor is delivered to the capacitor.

15. A cell balancing system comprising:
   a battery pack configured to include at least one battery cell;
   at least one first energy storage element configured to correspond to at least the one battery cell;
   a second energy storage element; and a cell balancing integrated circuit configured to provide a first energy delivery path along which energy of the overcharged battery cell is delivered to the corresponding first energy storage element or to provide a second energy delivery path along which energy stored in the first energy storage element is delivered to the second energy storage element in response to a mode signal.

16. The cell balancing system according to claim 15, further comprising:
a converter configured to convert the energy of the second energy storage element and deliver the converted energy to the undercharged battery cell.

17. The cell balancing system according to claim 15, wherein the first energy storage element is an inductor and the second energy storage element is a capacitor.

18. The cell balancing system according to claim 15, further comprising:
a voltage detection circuit configured to detect a voltage of the battery cell; and
a processor configured to provide the mode signal corresponding to overcharge or undercharge of the battery cell using the voltage detected by the voltage detection circuit.

19. The cell balancing system according to claim 18, wherein the voltage detection circuit and the processor are integrated into the cell balancing integrated circuit.

* * * * *